(12) United States Patent
Michioka et al.

(10) Patent No.: US 6,830,378 B2
(45) Date of Patent: Dec. 14, 2004

(54) METHOD OF MANUFACTURING ROLLING ELEMENT STRING

(75) Inventors: Hidekazu Michioka, Tokyo (JP); Yasuhiro Matsumoto, Tokyo (JP); Hiroshi Nakabayashi, Yamanashi-ken (JP); Katsuya Iida, Yamanashi-ken (JP); Daisuke Yatsushiro, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/645,583

(22) Filed: Aug. 22, 2003

(65) Prior Publication Data

US 2004/0057640 A1 Mar. 25, 2004

Related U.S. Application Data

(62) Division of application No. 09/656,413, filed on Sep. 6, 2000, now abandoned.

(30) Foreign Application Priority Data

Sep. 7, 1999 (JP) .......................................... 11-252572

(51) Int. Cl.$^7$ ............................................. F16C 29/04
(52) U.S. Cl. ......................................... 384/49; 384/45
(58) Field of Search ............................. 384/49, 43, 45, 384/47, 44

(56) References Cited

U.S. PATENT DOCUMENTS

| | | | |
|---|---|---|---|
| 3,878,734 A | 4/1975 | Zeldman et al. | ............... 74/229 |
| 5,684,088 A | 11/1997 | Miyamori et al. | ............ 525/64 |
| 5,755,516 A | 5/1998 | Teramachi et al. | ............ 384/45 |
| 5,947,605 A | 9/1999 | Shirai | ........................... 384/45 |
| 5,988,883 A | 11/1999 | Takamatu et al. | ............. 384/45 |
| 6,080,351 A | 6/2000 | Shirai | ......................... 264/267 |
| 6,152,602 A | 11/2000 | Honma et al. | ................. 384/45 |
| 6,155,718 A | 12/2000 | Takamatsu et al. | ........... 384/45 |

FOREIGN PATENT DOCUMENTS

| | | |
|---|---|---|
| DE | 42 02 098 | 7/1993 |
| JP | 62-090226 | 4/1987 |
| JP | 05-052215 | 3/1993 |
| JP | 05-052217 | 3/1993 |
| JP | 05-231431 | 9/1993 |
| JP | 06-173946 | 6/1994 |
| JP | 10-238539 | 9/1998 |

*Primary Examiner*—Lenard A. Footland
(74) *Attorney, Agent, or Firm*—Arent Fox PLLC

(57) ABSTRACT

An object of the invention is to provide a method of manufacturing a rolling element string wherein a smaller rolling element string can be manufactured easily at low cost, and a rolling element string being superior in the tensile strength and the flexural strength even after downsizing can be manufactured. The present invention to achieve the object is a method of manufacturing a rolling element string having a number of rolling elements aligned and rollably retained at prescribed intervals, comprising a first step of forming a flat band shaped belt member with a synthetic resin, a second step of forming retaining holes aligned on said belt member in a row for receiving the rolling elements loosely, and a third step of aligning the rolling elements within said retaining holes and forming the spacer portions between the respective adjacent retaining holes by injection molding for retaining said rolling element with said rolling elements used as cores, so that said rolling elements are trapped within said retaining holes.

1 Claim, 13 Drawing Sheets

METHOD OF MANUFACTURING ROLLING ELEMENT STRING

This is a Division of application Ser. No. 09/656,413 filed Sep. 6, 2000 now abandoned. The disclosure of the prior application is hereby incorporated by reference herein in its entirety.

BACKGROUND OF THE INVENTION

1. Field of the Invention

The present invention relates to a method of manufacturing a rolling element string in which a number of rolling elements are aligned and rollably held in a row at prescribed intervals, and which is used by integrating, for example, in a linear guide device for endless sliding. More specifically, the invention relates to an improved rolling element string the tensile strength and the flexural strength of which are enhanced.

2. Description of the Related Art

Conventionally, the known linear guide device for guiding a movable body such as a table along the fixed portion such as a bed is of the type that comprises a rollway having a ball rolling groove, a slider having a loaded rolling groove opposed to the ball rolling groove and a no-load rollway in which the ball is circulated from one end to the other end of the loaded rolling groove and moving along the rollway, and a number of balls rolling between the slider and the rollway under loaded conditions and circulating along the endless raceway composed of a loaded rolling groove and a no-load rollway of the slide.

In the conventional linear guide device in this arrangement, since the endless raceway of the slider is filled with balls, when the slider moves along the rollway, the adjacent balls tend to collide with or rub against each other as they circulate along the endless raceway, which results in earlier abrasion of balls and shorter operational life of the device.

Therefore, in order to solve the problem described above, a linear guide device incorporating a rolling element string having a plurality of balls aligned in a row into the endless raceway has been proposed (Japanese Patent Laid-Open No. 5-52217). As shown in FIG. 17 and FIG. 18, the rolling element string 100 comprises ball retaining members 102 interposed between the respective adjacent balls 101 and is constructed in such a manner that the balls are linked consecutively by linking the respective ball retaining members 102 with a pair of belt members 103 disposed in the direction of alignment of the balls 101, and is manufactured by injection molding of a flexible resin with the balls 101 disposed in a mold as cores.

In the conventional rolling element string 100 arranged in such a manner being incorporated into the endless raceway 105 and circulating along the endless raceway as shown in FIG. 19, since the ball retaining members 102 are interposed between the respective adjacent balls 101, friction or collision between balls are prevented from being occurred and abrasion of the balls 101 could be avoided as much as possible.

However, in the conventional method, since an elongated rolling element string of the length corresponding to an orbit of the endless raceway is manufactured by injection molding, there has been a problem in that a number of gates for injecting molten resin into a cavity in the mold must be provided to make the belt member 103 for linking the respective ball retaining members 102 form in a uniform thickness, whereby the mold becomes complex and the cost increases.

There has been another problem in that considering further downsizing of the linear guide device requires the thinner belt member for the rolling element string to be incorporated in the endless raceway, and decrease in the tensile strength and the flexural strength of the belt member associated with thinning thereof may cause breakage of the rolling element string in the endless raceway, thereby impairing the ball retaining capability of the rolling element string.

There has been still another problem in that when contemplating further thinning of the belt member, the molten resin injected from the gate may not reach the deepest portion of the cavity in the mold, thereby resulting in a number of defective moldings and thus reducing yields.

SUMMARY OF THE INVENTION

The present invention is directed toward the problems described above, and accordingly, it is an object of the present invention to provide a method of manufacturing a rolling element string in which further downsized rolling element string may be manufactured easily at low cost, and in which the rolling element string having superior tensile strength and flexural strength may be manufactured even after downsizing.

In other words, the present invention is a method of manufacturing a rolling element string having a number of rolling elements aligned and rollably held in a row at prescribed intervals comprising a first step of forming a flat band shaped belt member with a synthetic resin, a second step of forming retaining holes aligned in a row on the belt member for receiving rolling elements loosely, and a third step of placing the rolling elements in the respective retaining holes, forming spacer portions between the respective adjacent retaining holes for retaining the rolling elements therein by injection molding with these rolling elements used as cores, and trapping the rolling elements within the retaining holes.

According to the method of the present invention, since the spacer portions are formed after the flat band shaped belt member is molded in the first step, and then the rolling elements are trapped within the retaining holes formed on the belt member, the belt member may be formed consecutively in a long strip for example by extrusion molding of a synthetic resin, not by injection molding. Therefore, even when the thickness of the belt member is reduced in association with downsizing of the rolling element string, the belt member of uniform thickness may be formed stably.

In addition, since the belt member and the spacer portions are formed separately, the belt member can be formed of a synthetic resin material that is completely different from a molding material used for the spacer portions. Therefore, by forming the belt member with a synthetic resin the tensile strength or flexural strength of which has been improved by adding, for example, carbon filler, the rolling element string of high tensile strength may be manufactured even if the thickness of the belt portion is reduced. On the other hand, since the spacer portions are to be kept in slide-contact with the rolling elements, the material for the spacer portions may be selected to have a low friction coefficient such as oleoresin, thereby ensuring smooth rotation of the rolling elements.

It is also possible to integrate a reinforcing material such as a carbon fiber or a glass fiber along the length of the belt member as the belt member is formed by extrusion molding, whereby the tensile strength of the belt member can be increased even when the tensile strength or flexural strength of the synthetic resin constituting the belt member is low.

As is described thus far, according to the method of manufacturing the rolling element string of the present invention, since the spacer portions for retaining the rolling element within the belt member are formed by injection molding after the belt member for aligning the rolling elements is molded, the belt can be consecutively formed in a long strip by extrusion molding, but not by injection molding, whereby the belt member of a uniform thickness may be formed easily at low cost even when the thickness of the belt member is reduced in association with downsizing of the rolling element string.

DESCRIPTION OF THE PREFERRED EMBODIMENTS

Figure 1:
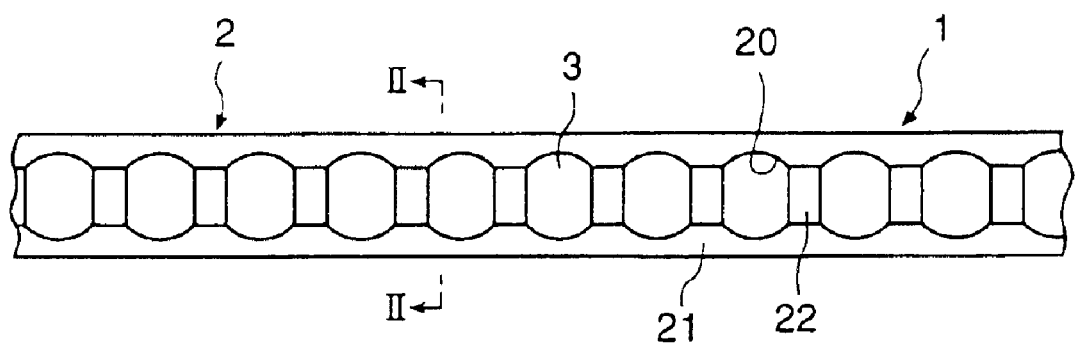
FIG. 1 is a plan view showing the first embodiment of the rolling element string manufactured according to the method of the present invention.

Referring now to the drawings, the present invention will be described.

Figure 2:
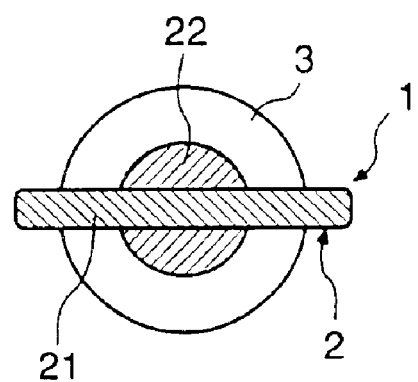
FIG. 2 is a cross sectional view showing the rolling element string of FIG. 1 taken along the line II—II.
Figure 3:
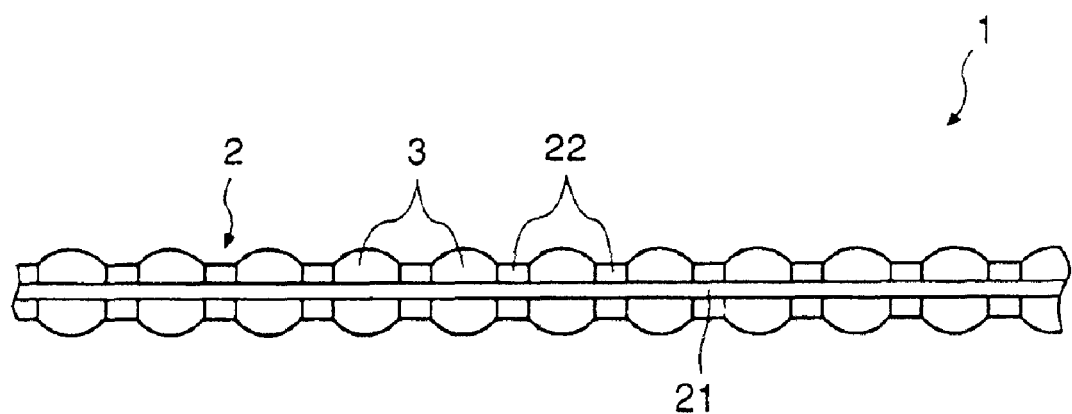
FIG. 3 is a front view showing the rolling element string according to the first embodiment.

FIGS. 1 to 3 show the first embodiment of the rolling element string manufactured according to the method of the present invention. The rolling element string 1 comprises a string belt 2 formed of a synthetic resin and balls 3 as rolling elements aligned in a row at prescribed intervals, and these balls 3 are rollable in the state of being retained in the string belt 2.

The string belt 2 comprises a belt member 21 formed in the flat band shape and having retaining holes 20 for retaining balls 3 at prescribed intervals, and spacer portions 22 projecting from both surfaces of the belt member 21 between the respective adjacent retaining holes 20, wherein balls 3 are rollably trapped within the retaining holes 20 of the belt member 21 by the respective spacer portions 22.

The method of manufacturing the rolling element string 1 will now be described step-by-step.

Figure 4:
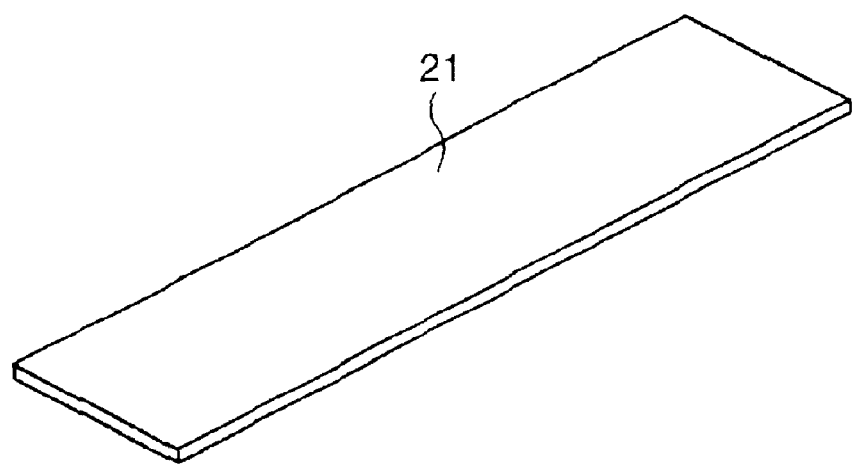
FIG. 4 is a perspective view showing the belt member of the first embodiment formed in the first step of the method of the present invention.
Figure 5:
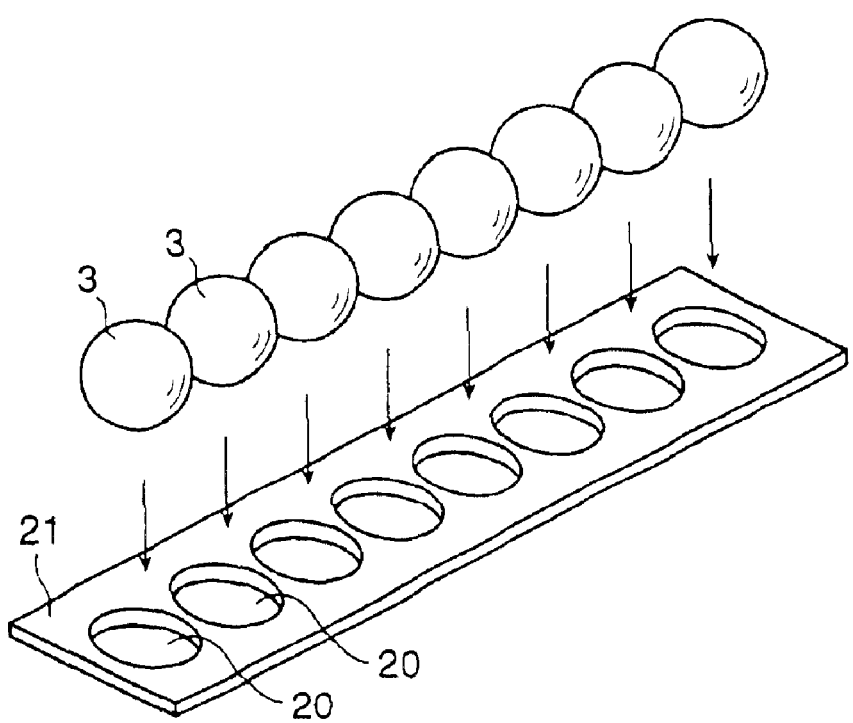
FIG. 5 is a perspective view showing how the ball retaining holes are formed on the belt of the first embodiment and how the balls are aligned in the ball retaining holes.

FIG. 4 shows a belt member 21 formed in the first step of the present invention. The belt member 21 is manufactured by extrusion molding of a synthetic resin. The belt member 21 consecutively extruded from the molding die is cooled down in a water tank, and then wound by a reel. In the subsequent step, the belt member 21 wound on the reel is cut into a prescribed length and used.

Since the belt member 21 before the spacer portions 22 are built up thereon has an uniform cross section along its length, the belt member 21 of a uniform thickness can be formed by extrusion molding easily at low cost even when the belt member 21 is thin.

The belt member 21 formed in such a manner is cut into a length corresponding to one orbit of the endless raceway of the linear guide device, and then formed with retaining holes 20 for retaining balls 3 along its length at prescribed intervals. The retaining hole 20 is formed in such a manner that the inner diameter thereof is somewhat larger than the diameter of the ball 3, so that the ball 3 can be put in and taken out without any friction. Injection molding of the spacer portions 22 is carried out with the balls 3 aligned within these retaining holes 20.

Figure 6:
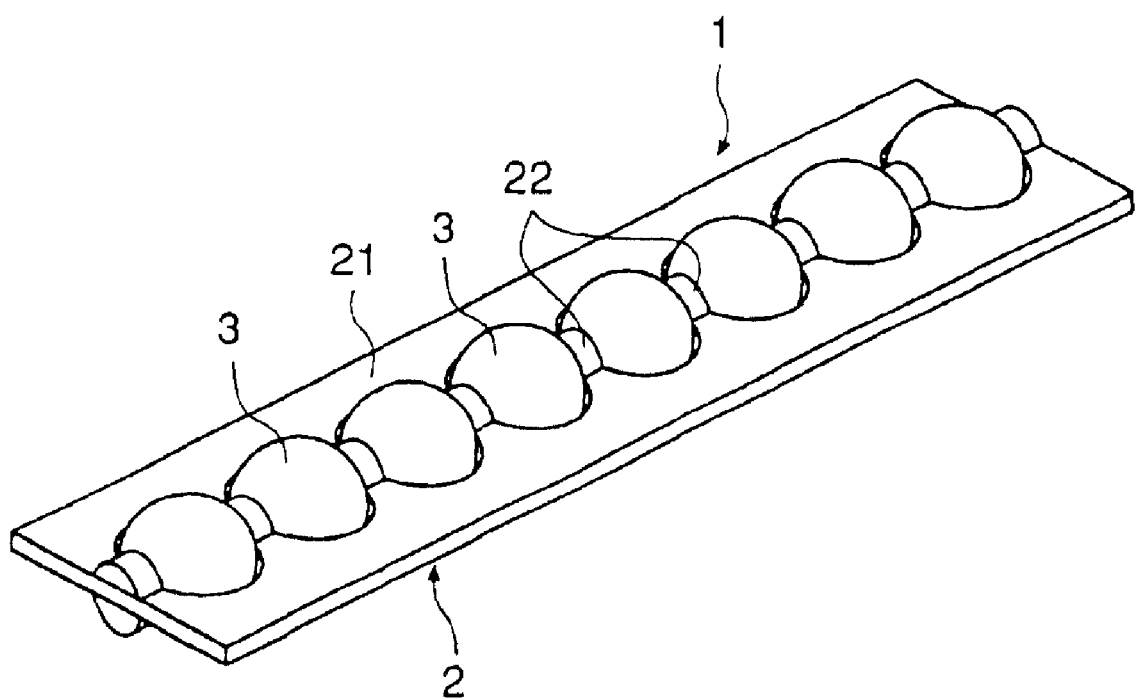
FIG. 6 is a perspective view showing the state that the spacer portions are formed by injection molding on the belt member of the first embodiment having balls aligned therein.

Injection molding is carried out in the state where the belt member 21 cut into a prescribed length is set in the mold at a prescribed position and the balls 3 are placed in the respective retaining holes 20 formed on the belt member 21, with such belt member 21 and balls 3 used as cores. The spacer portions 22 are built up between the respective adjacent retaining holes 20 on the belt member 21 so as to cover a part of the surfaces of the balls 3, and the balls 3 partly covered are trapped within the retaining holes 20 of the belt member 21. Accordingly, as shown in FIG. 6, a string belt 2 having balls 3 aligned and retained at prescribed intervals on the belt member 21 is completed. In injection molding of the spacer portions 22, a synthetic resin such as polyamide elastomer or polyester elastomer is used as in the case of molding the belt member 21. By forming the spacer portions 22 by injection molding using the identical synthetic resin as the belt member 21, the spacer portions 22 are welded to the belt member 21 when being molded, and as a consequence, the spacer portion 22 and the belt member 21 are securely integrated.

When the spacer portions 22 are formed by injection molding with the balls 3 as cores, the spacer portions 22 come into intimate contact with the surfaces of the balls 3, thereby preventing smooth rolling of the ball. Therefore, upon completion of such injection molding, the belt member 21 is soaked into oil for a certain period of time. Since the string belt 2 formed of a synthetic resin takes up oil and thus swells, small gaps are formed between the spacer portions 22 and the balls 3 after a prescribed period of time has elapsed, thereby permitting free rolling of the balls 3 without falling off the retaining holes 20. The rolling element string 1 is thus completed.

On the other hand, it is also possible to mold the spacer portions 22 by aligning ball models (rolling element model), which is slightly larger than the ball 3 in diameter, in the retaining holes 20 of the belt member 21 and molding with the ball models and the belt member 21 used as cores. When the balls 3 are used as cores, the step of forming gaps between respective balls 3 and spacers 22 is required after the completion of molding of the spacer portions 22, as described above. On the other hand, in case where the ball models are used as cores, since the ball models are slightly larger than the balls 3, the spacer portions 22 become smaller correspondingly. Therefore, by forcing the ball models out the string belt 2 and then fitting balls 3 instead when molding of the spacer portions 22 is finished, the balls 3 can roll within the retaining holes 20 freely without a time consuming step of soaking the string belt 2 into oil for a prescribed period of time.

According to the method of manufacturing the rolling element string 1 as described above, formation of an elongated rolling element string in a mold by injection molding as in the conventional manner is not necessary any more, and the rolling element string 1 comprising a thin belt member 21 can be manufactured simply at low cost and stably.

According to the method of manufacturing the rolling element string 1 as described thus far, the same material as the spacer portion 22 is used for the belt member 21, and a reinforcing material 23 is integrated within the belt member 21 in order to enhance the tensile strength and the flexural strength of the belt member 21. However, it is also possible to enhance the tensile strength and the flexural strength of the belt member 21 by adding carbon filler or the like to the material for the belt member 21 itself to compensate deterioration of the tensile strength and the flexural strength of the belt member 21 associated with the reduction of the thickness thereof.

Figure 7:
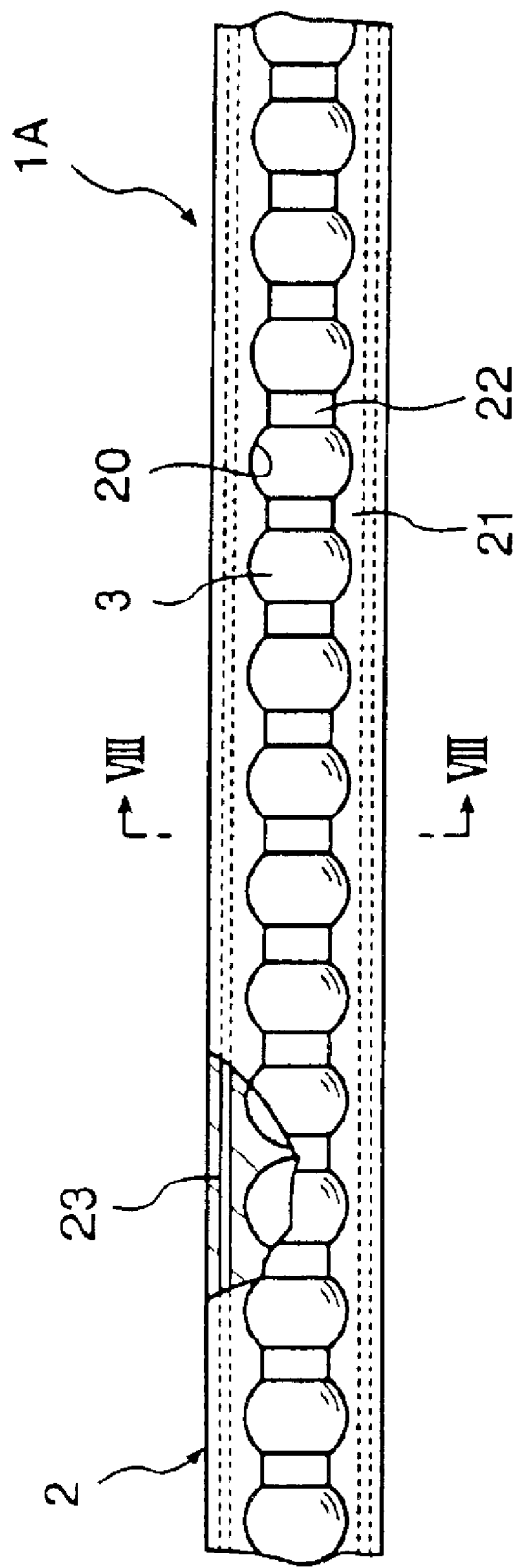
FIG. 7 is a plan view showing the second embodiment of the rolling element string manufactured according to the method of the present invention.
Figure 8:
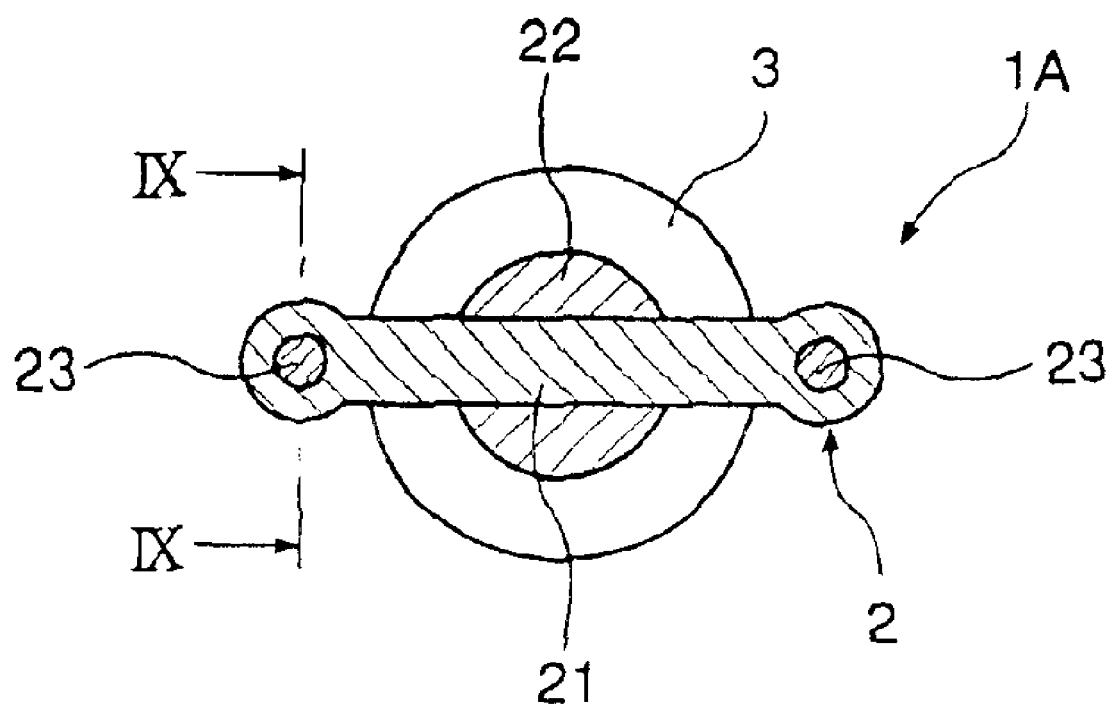
FIG. 8 is a cross sectional view of the rolling element string of FIG. 7 taken along the line VIII—VIII.
Figure 9:
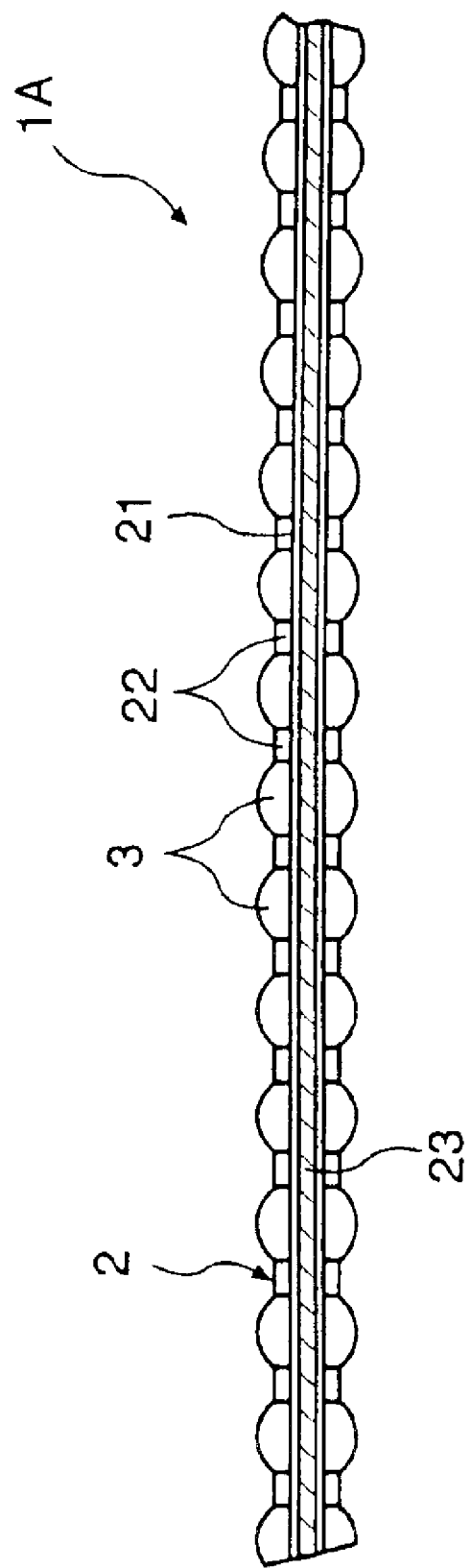
FIG. 9 is a cross sectional view of the rolling element string of FIG. 8 taken along the line IX—IX.

FIGS. 7 to 9 show the second embodiment of the rolling element string manufactured according to the method of the present invention.

The rolling element string 1A has almost the same structure as the rolling element string 1 of the first embodiment. However, as shown in cross sectional views of FIG. 8 and FIG. 9, the belt member 21 includes a reinforcing material such as a glass fiber, a carbon fiber, or a ceramics fiber integrated in both edge portions along its length. Therefore, when the tensile force is applied along the length of the string belt 2, the tensile force is loaded onto the reinforcing material 23, whereby breakage of the string belt 2 can be prevented more effectively than in the first embodiment. The same reference numerals are designated to the components identical to the first embodiment, and detailed description will be omitted.

The method of manufacturing the rolling element string 1A will now be described step-by-step.

Figure 10:
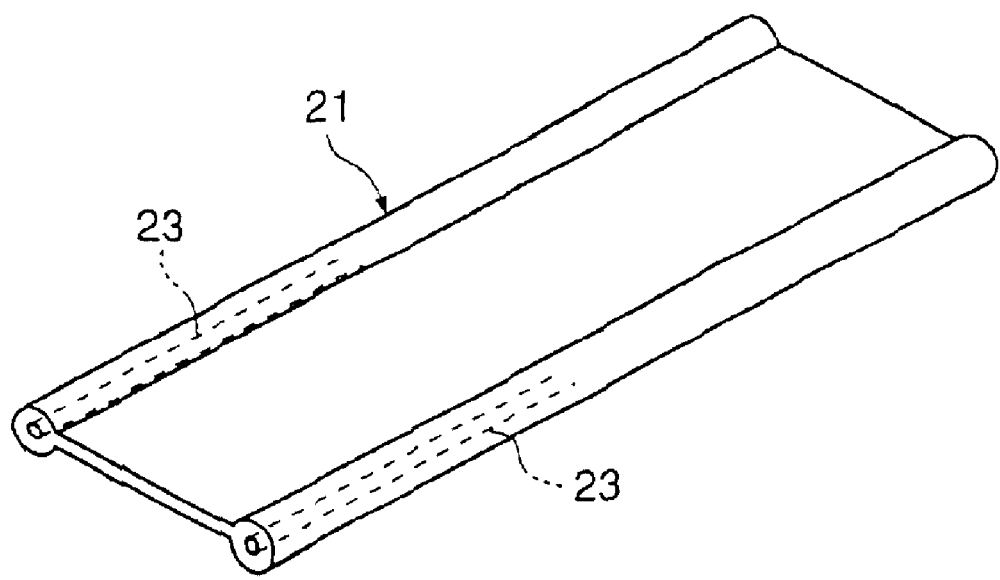
FIG. 10 is a perspective view of the second embodiment formed in the first step of the method according to the present invention.

FIG. 10 shows a belt member 21 formed in the first step of the present invention. The belt member 21 is manufactured by extrusion molding of a synthetic resin, and a reinforcing material 23 described above is integrated therein during extrusion molding.

Figure 11:
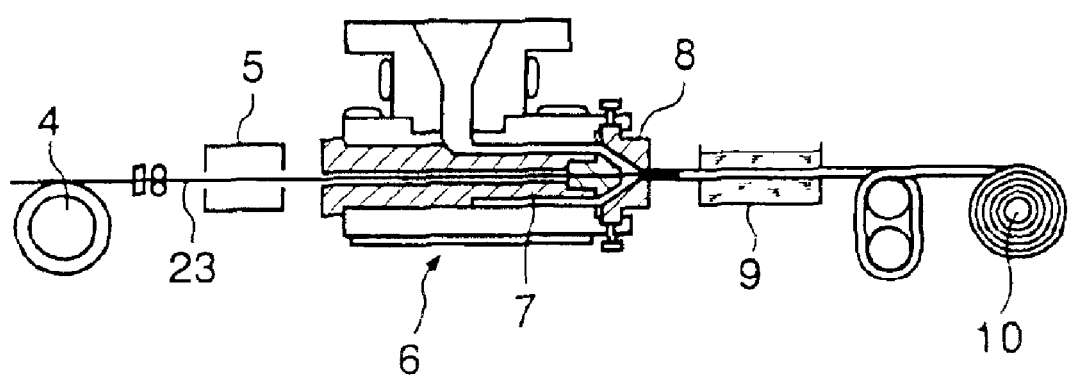
FIG. 11 is a drawing illustrating a step of forming the belt member of the second embodiment having reinforcing material incorporated therein by extrusion molding of a synthetic resin.

FIG. 11 is a schematic illustration showing the step of carrying out extrusion molding of the belt member 21 while integrating a reinforcing material. The reinforcing material 23 is wound on a large diameter reel 4. The reinforcing material 23 unwound from the reel 4 is preheated by the pre-heater 5, then passed through the mandrel 7 of the cross head die 6 and pulled out of the molding die 8. A molten synthetic resin such as polyamide elastomer or polyester elastomer is forced into the cross head die 6 by a screw, not shown, and built up around the reinforcing material 23 as the reinforcing material 23 is extruded from the molding die 8, whereby an elongated belt member 21 is consecutively extruded from the cross head die 6. The extruded belt member 21 is cooled down in the water tank 9 and then wound by the reel 10, which is cut into a prescribed length and used in the subsequent step.

Figure 12:
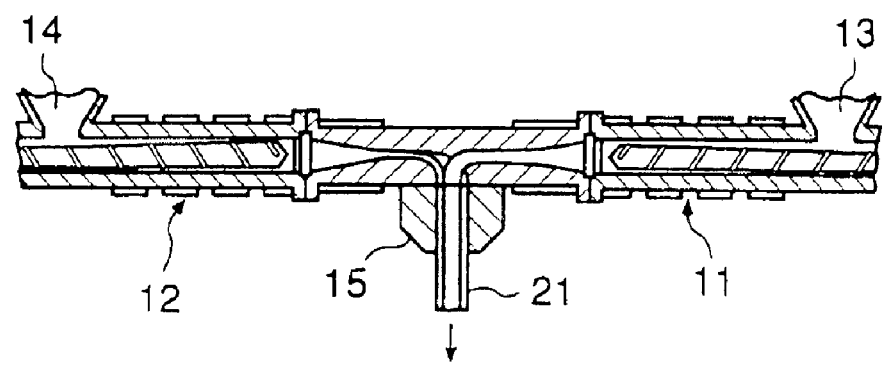
FIG. 12 is a drawing illustrating a step of forming the belt member of the second embodiment by extrusion molding with two types of synthetic resin the physical properties of which are different from each other.

The reinforcing material 23 may not be necessarily a glass fiber itself, but may be a synthetic resin the tensile strength or the flexural strength of which has been improved by adding carbon filler or the like. In such a case, double-layer extrusion molding may be employed to form the belt member 21 of the shape shown in FIG. 10. As shown in FIG. 12, two extruders 11, 12 are used in this double-layer extrusion. After setting a synthetic resin for forming a reinforcing material in the hopper 13 of one extruder 11 and a synthetic resin for covering the reinforcing material in the hopper 14 of the other extruder 12, these synthetic resins are extruded from the common die 15. Then, as in FIG. 11, the extruded belt member 21 is cooled down in the water tank and wound by the reel, and an elongated belt member 21 including a synthetic resin of high tensile strength and flexural strength as a reinforcing material 23 covered with another type of synthetic resin can be obtained.

In this manner, even when a reinforcing material 23 is integrated within the belt member 21, the belt member 21 before the spacer portion 22 is built up thereon has a uniform cross section along its length, whereby the belt member 21 of a uniform thickness may be formed simply at low cost as in the case of the first embodiment.

Figure 13:
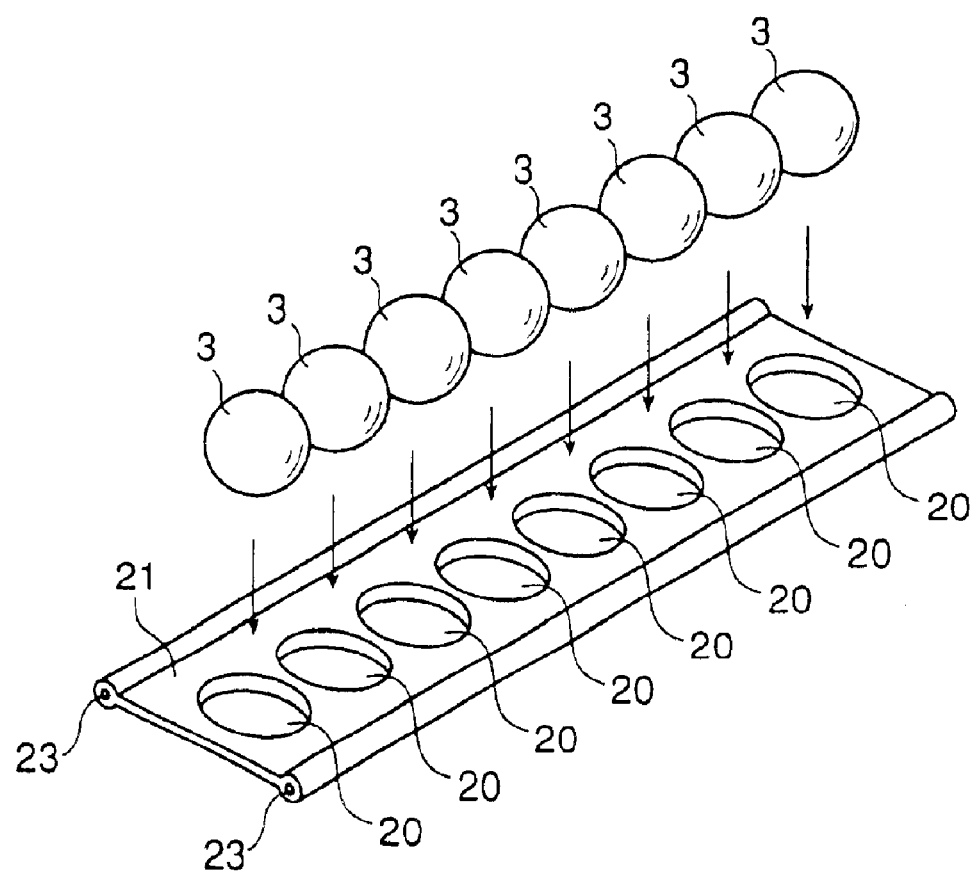
FIG. 13 is a perspective view showing how the ball retaining holes are formed on the belt of the second embodiment and how the balls are aligned in the ball retaining holes.
Figure 14:
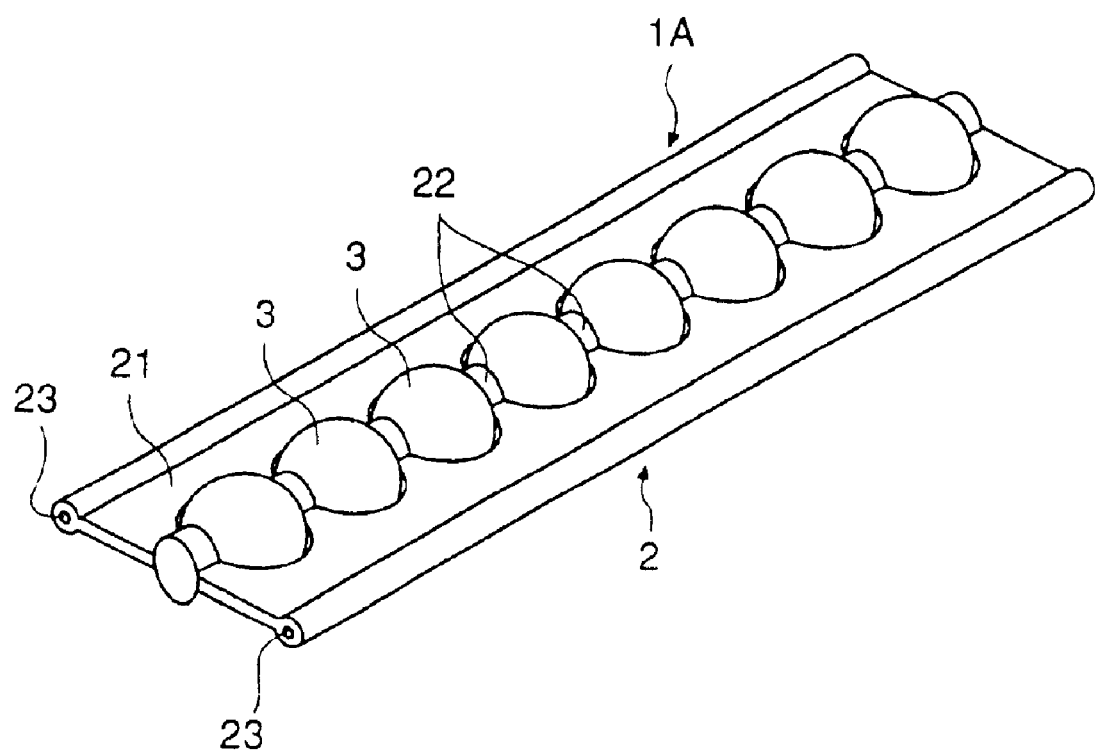
FIG. 14 is a perspective view showing the state where the spacer portions are formed by injection molding on the belt member of the second embodiment having balls aligned therein.

Subsequently, molding of the spacer portion 22 is carried out in the same manner as the rolling element string 1 of the first embodiment that does not comprise a reinforcing material 23. In other words, the belt member 21 cut into the length corresponding to one orbit of the endless raceway of the linear guide device is formed with retaining holes 20 for retaining the balls 3 along its length at prescribed intervals as shown in FIG. 13, and injection molding of the spacer portions 22 is carried out with the balls 3 aligned in these retaining holes 20. The string belt 2 after molding of the spacer portion 22 has finished is soaked in oil for a certain period of time, thereby gaps for allowing the balls 3 to roll are formed between the spacers 22 and the balls 3. As a consequent, as shown in FIG. 14, the rolling body string 1A of the second embodiment having a reinforcing material 23 integrated therein is completed.

Figure 15:
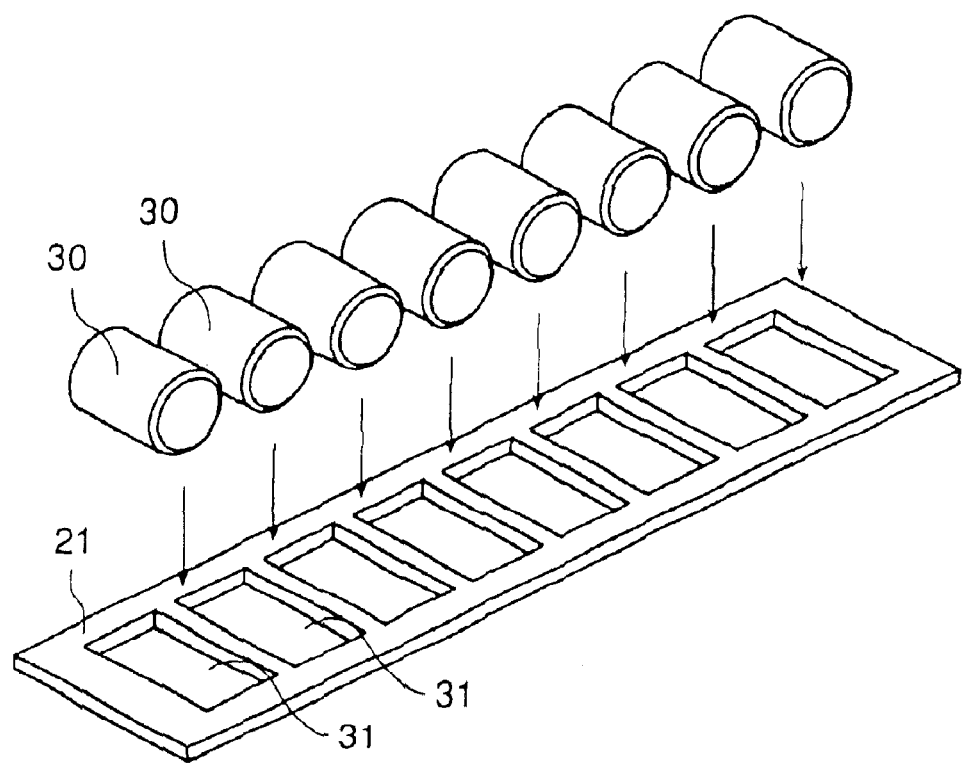
FIG. 15 is a perspective view showing how the roller retaining holes are formed on the belt and how the rollers are aligned in the roller retaining holes.
Figure 16:
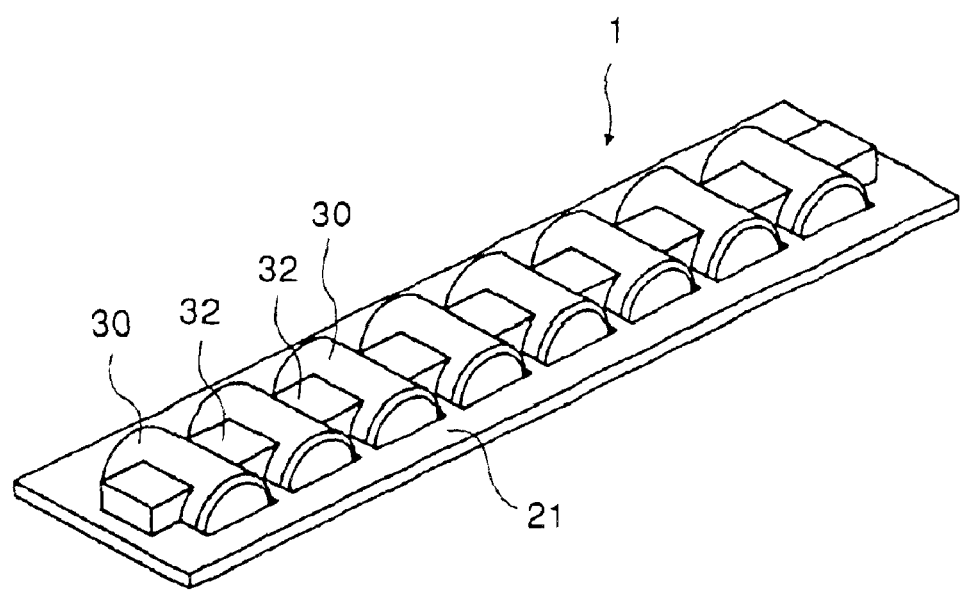
FIG. 16 is a perspective view showing the state where the spacers are formed by injection molding on the belt member having rollers aligned therein.
Figure 17:
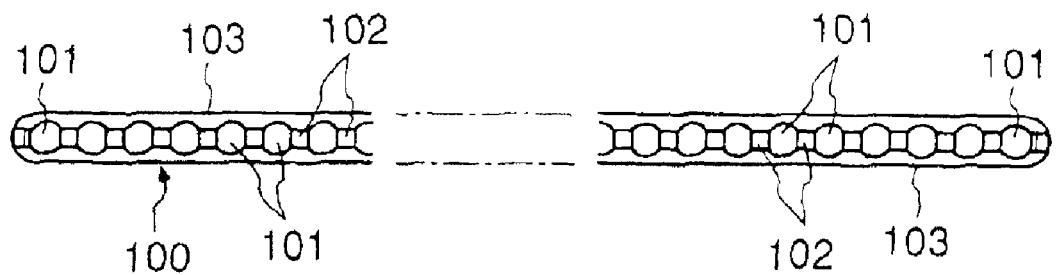
FIG. 17 is a plan view showing the conventional rolling element string.
Figure 18:
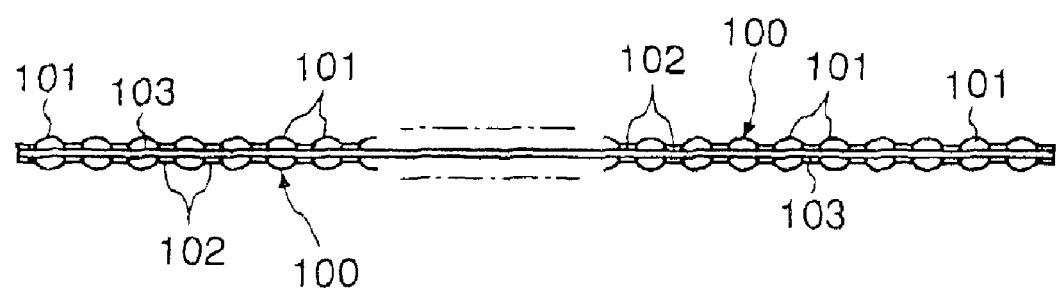
FIG. 18 is a front view showing the conventional rolling element string.
Figure 19:
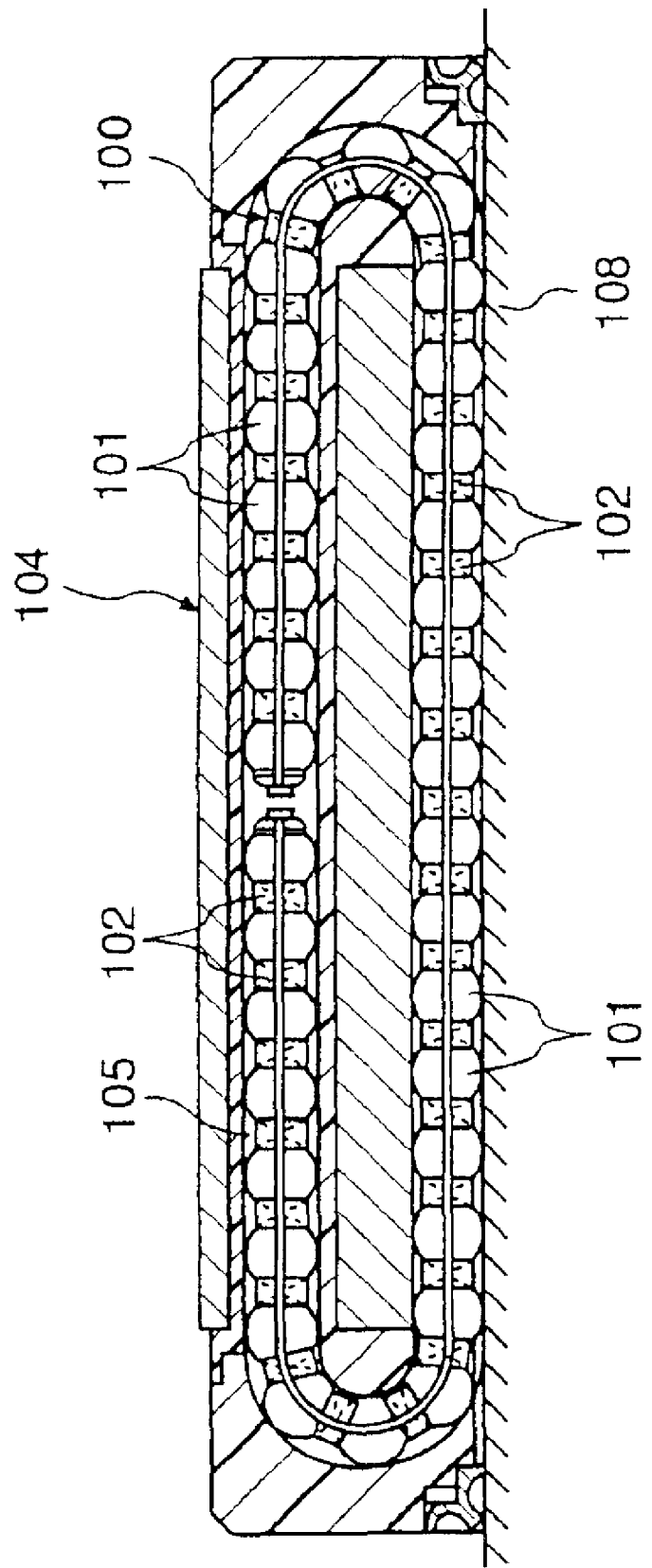
FIG. 19 is a cross sectional view showing the state where the rolling element string is incorporated in the endless raceway of the linear guide device.

In the embodiments as is described thus far, balls are employed as rolling elements to be aligned in the belt member. However, this invention may be applied to the case where rollers are employed as rolling elements. More specifically, as shown in FIG. 15, after forming retaining holes 31 for rollers 30 on the belt member 21 along its length at prescribed intervals, injection molding is carried out with the rollers 30 aligned in these retaining holes 31 as shown in FIG. 16. As a consequent, the rollers 30 are trapped within the retaining holes 31 of the belt member 21, and as is in the case where the balls 3 are employed as rolling elements, the string belt 2 having the rollers 30 aligned and retained in the belt member 21 at prescribed intervals may be completed.

What is claimed is:

1. A rolling element string comprising a number of rolling elements for rolling between a slider and a rollway of a linear guide device under loaded conditions and circulating along an endless raceway of the slider, and a string belt by which these rolling elements aligned in a row at prescribed intervals and each rolling elements rollably retained, the string belt comprising:

a belt member formed in the flat band shape and having retaining holes with a central portion in width direction of it for retaining these rolling elements;

spacer portions projecting from both surfaces of the belt member between the respective adjacent retaining holes for trapping the rolling element within the retaining holes of the belt member;

a pair of reinforcing material portions included the belt member integrated in both edge portions along its length;

wherein a thickness of the central portion of the belt member is thinner than the both edge portions of the belt member.

\* \* \* \* \*